(12) United States Patent
Yang et al.

(10) Patent No.: US 11,847,003 B2
(45) Date of Patent: Dec. 19, 2023

(54) FOLDING DEVICE AND HEAT DISSIPATION APPARATUS

(71) Applicant: Huawei Technologies Co., Ltd., Shenzhen (CN)

(72) Inventors: Guo Yang, Minsk (BY); Tao Huang, Dongguan (CN); Wenming Shi, Dongguan (CN); Teng Long, Wuhan (CN); Wei Li, Dongguan (CN); Jianliang Wang, Dongguan (CN); Zhiguo Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 17/130,289

(22) Filed: Dec. 22, 2020

(65) Prior Publication Data

US 2021/0109575 A1 Apr. 15, 2021

Related U.S. Application Data

(63) Continuation of application No. PCT/CN2019/112499, filed on Oct. 22, 2019.

(30) Foreign Application Priority Data

Oct. 26, 2018 (CN) .......................... 201821757971.0
Oct. 15, 2019 (CN) .......................... 201910978750.9

(51) Int. Cl.
*G06F 1/20* (2006.01)
*G06F 1/16* (2006.01)

(52) U.S. Cl.
CPC ............ *G06F 1/203* (2013.01); *G06F 1/1681* (2013.01); *G06F 2200/203* (2013.01)

(58) Field of Classification Search
CPC ............ G06F 2200/203; G06F 1/1681; G06F 1/1616; G06F 1/20; G06F 1/206;
(Continued)

(56) References Cited

U.S. PATENT DOCUMENTS 5,588,483 A * 12/1996 Ishida .................... H01L 23/427
361/679.52
5,621,613 A * 4/1997 Haley ..................... G06F 1/203
361/679.52

(Continued)

FOREIGN PATENT DOCUMENTS

CN        1653405 A      8/2005
CN     201064083 Y       5/2008
(Continued)

*Primary Examiner* — Michael A Matey
(74) *Attorney, Agent, or Firm* — James Anderson Harrison

(57) ABSTRACT

A folding device and a heat dissipation apparatus, where the folding device includes a heat collection element, including a heat collection plate and a first shaft sleeve, where a first end of the heat collection plate is in contact with a heat source in a first folding part, and a second end of the heat collection plate is coupled to an outer wall of the first shaft sleeve, the first shaft sleeve is sleeved on a rotating shaft, and a third end of the cooling element is in contact with the rotating shaft, and a fourth end of the cooling element is in contact with a heat dissipation device in a second folding part.

19 Claims, 10 Drawing Sheets

(58) Field of Classification Search
CPC ............ G06F 1/1637; G06F 2200/201; H05K
1/0209; H05K 7/2039; H05K 7/20509;
H05K 1/0203; H05K 1/0204; H05K
1/181; H05K 13/04; H05K 5/0226; H05K
7/20963; F28F 2280/10; H04M 1/022
See application file for complete search history.

(56) References Cited

U.S. PATENT DOCUMENTS

| | | | | |
|---|---|---|---|---|
| 5,718,282 A * | 2/1998 | Bhatia | ............... | G06F 1/203 |
| | | | | 361/679.52 |
| 5,832,987 A * | 11/1998 | Lowry | ............... | G06F 1/203 |
| | | | | 361/679.52 |
| 5,847,925 A * | 12/1998 | Progl | ............... | G06F 1/203 |
| | | | | 361/679.52 |
| 5,910,883 A * | 6/1999 | Cipolla | ............... | F28D 15/0233 |
| | | | | 361/679.52 |
| 6,069,791 A * | 5/2000 | Goto | ............... | G06F 1/203 |
| | | | | 361/679.55 |
| 6,075,696 A * | 6/2000 | Progl | ............... | G06F 1/203 |
| | | | | 361/679.52 |
| 6,097,596 A * | 8/2000 | Cipolla | ............... | G06F 1/203 |
| | | | | 361/679.55 |
| 6,175,493 B1 * | 1/2001 | Gold | ............... | G06F 1/203 |
| | | | | 361/679.55 |
| 6,250,378 B1 * | 6/2001 | Kobayashi | ............... | F28D 15/0266 |
| | | | | 361/679.52 |
| 6,253,836 B1 | 7/2001 | Mitchell | | |
| 6,288,896 B1 * | 9/2001 | Hsu | ............... | G06F 1/203 |
| | | | | 174/15.2 |
| 6,377,452 B1 * | 4/2002 | Sasaki | ............... | G06F 1/203 |
| | | | | 165/185 |
| 6,392,883 B1 * | 5/2002 | Ali | ............... | G06F 1/203 |
| | | | | 361/679.52 |
| 6,493,226 B1 * | 12/2002 | Noguchi | ............... | G06F 1/203 |
| | | | | 361/679.55 |
| 6,771,498 B2 * | 8/2004 | Wang | ............... | G06F 1/203 |
| | | | | 361/679.52 |
| 7,288,895 B2 * | 10/2007 | Rossi | ............... | H01J 61/52 |
| | | | | 315/112 |
| 7,486,974 B2 * | 2/2009 | Pan | ............... | G06F 1/1616 |
| | | | | 455/575.1 |
| 10,551,881 B2 * | 2/2020 | Ho | ............... | G06F 1/206 |
| 10,775,842 B1 * | 9/2020 | Peng | ............... | G06F 1/1681 |
| 2002/0051339 A1 * | 5/2002 | Ohashi | ............... | G06F 1/203 |
| | | | | 361/679.46 |
| 2005/0141193 A1 | 6/2005 | Otsuki et al. | | |
| 2008/0130221 A1 * | 6/2008 | Varadarajan | ............... | G06F 1/203 |
| | | | | 361/679.52 |
| 2010/0053885 A1 * | 3/2010 | Ali | ............... | G06F 1/1681 |
| | | | | 361/679.54 |
| 2014/0009888 A1 * | 1/2014 | MacDonald | ............... | G06F 1/206 |
| | | | | 361/701 |
| 2014/0098489 A1 * | 4/2014 | Chiriac | ............... | G06F 1/203 |
| | | | | 312/236 |
| 2018/0284856 A1 * | 10/2018 | Shah | ............... | G06F 1/1616 |
| 2019/0041922 A1 * | 2/2019 | Kurma Raju | ............... | G06F 1/1637 |
| 2019/0254194 A1 * | 8/2019 | Paavola | ............... | F28D 15/0208 |
| 2020/0356143 A1 * | 11/2020 | Oh | ............... | G06F 1/203 |

FOREIGN PATENT DOCUMENTS

| | | |
|---|---|---|
| CN | 101600329 A | 12/2009 |
| CN | 107479305 A | 12/2017 |
| CN | 206890202 U | 1/2018 |
| JP | 2005197303 A | 7/2005 |
| WO | 9844554 A1 | 10/1998 |
| WO | 03098415 A1 | 11/2003 |

\* cited by examiner

US 11,847,003 B2

FOLDING DEVICE AND HEAT DISSIPATION APPARATUS

CROSS-REFERENCE TO RELATED APPLICATIONS

This application is a continuation of International Patent Application No. PCT/CN2019/112499 filed on Oct. 22, 2019, which claims priority to Chinese Patent Application No. 201821757971.0 filed on Oct. 26, 2018 and Chinese Patent Application No. 201910978750.9 filed on Oct. 15, 2019. The disclosures of the aforementioned applications are hereby incorporated by reference in their entireties.

TECHNICAL FIELD

This application relates to the field of electronic devices, and in particular, to a folding device and a heat dissipation apparatus.

BACKGROUND

A conventional notebook computer, a two-in-one notebook computer, and the like are folding devices frequently used in daily life. The folding device includes two folding parts located on two sides of a rotating shaft, and the two folding parts may be folded together. After the folding device runs for a specific period of time, devices such as a central processing unit (CPU) and a mainboard in the folding device generate heat. Therefore, timely heat dissipation needs to be performed for the folding device, to control a temperature of the folding device to be in a relatively stable range to ensure normal working of the folding device.

A heat generation device of the conventional notebook computer is located in a folding part in which a keyboard is located, and heat dissipation methods of the conventional notebook computer mainly include air cooling and natural cooling. In the air cooling method, heat dissipation is performed using a heat pipe module and a fan that are disposed in the folding part in which the keyboard is located. The heat generation device transfers heat to the heat pipe module, and then the heat pipe module transfers the heat to fins of the fan. When the fins rotate, the heat is dissipated to air. In the natural cooling method, heat dissipation is performed using a heat pipe or a graphite sheet disposed in the folding part in which the keyboard is located. Further, the heat generation device transfers heat to the heat pipe or the graphite sheet, and then the heat pipe or the graphite sheet dissipates the heat to air.

A heat generation device of the two-in-one notebook computer is located in a folding part in which a screen is located. Heat dissipation is performed for the two-in-one notebook computer using a housing of the folding part in which the screen is located. Further, the heat generation device transfers heat to the housing, and then the housing dissipates the heat to air.

However, in the foregoing heat dissipation method, both the heat generation device and the heat dissipation device of the folding device are located in a same folding part, that is, the folding device can perform heat dissipation only using the folding part in which the heat generation device is located. Consequently, there is a limited heat dissipation region and a relatively small heat dissipation area, resulting in a poor heat dissipation effect.

SUMMARY

This application provides a folding device and a heat dissipation apparatus, to resolve a problem, in a related technology, that a poor heat dissipation effect is caused due to a limited heat dissipation region of a folding device. The technical solutions are as follows.

According to a first aspect, a folding device is provided. The folding device includes a first folding part, a second folding part, and a heat dissipation apparatus. The first folding part includes a heat source. The second folding part includes a heat dissipation device. The heat dissipation apparatus includes a heat collection element, a rotating shaft, and a cooling element. The heat collection element includes a heat collection plate and a first shaft sleeve. A first end of the heat collection plate is in contact with the heat source in the first folding part, and a second end of the heat collection plate is connected to an outer wall of the first shaft sleeve. The first shaft sleeve is sleeved on the rotating shaft. A first end of the cooling element is in contact with the rotating shaft, and a second end of the cooling element is in contact with the heat dissipation device in the second folding part.

It should be noted that the heat collection element is a device configured to collect heat generated by the heat source in the first folding part and transfer the heat to the rotating shaft. The heat collection plate may collect the heat generated by the heat source in the first folding part, and transfer the heat to the first shaft sleeve connected to the heat collection plate. The first shaft sleeve is sleeved on the rotating shaft, and therefore the first shaft sleeve may continue to transfer, to the rotating shaft, the heat transferred from the heat collection plate.

In addition, the rotating shaft is a cylindrical device configured to continue to transfer, to the cooling element, the heat transferred from the heat collection element, and the rotating shaft may rotate in the first shaft sleeve. A difference between an inner diameter of the first shaft sleeve and a diameter of the rotating shaft may be greater than or equal to a first preset value. In such a condition, when the rotating shaft rotates in the first shaft sleeve, the first shaft sleeve and the heat collection plate connected to the first shaft sleeve are not driven to rotate. In this way, no impact is exerted on engagement or separation between the first folding part and the second folding part.

Furthermore, the cooling element is a device configured to continue to transfer, to the heat dissipation device in the second folding part, the heat transferred from the rotating shaft. A shape, a size, and the like of the cooling element may be set based on a use requirement. This is not limited in this embodiment of this application.

In this embodiment of this application, the folding device may transfer the heat generated by the heat source in the first folding part to the heat dissipation device in the second folding part. In this way, a heat dissipation region of the heat source is expanded, and a heat dissipation area of the folding device is increased. Therefore, a heat dissipation effect of the folding device is improved.

A thermally conductive lubricating material is added between an inner wall of the first shaft sleeve and the rotating shaft.

It should be noted that the thermally conductive lubricating material is thermally conductive, and can reduce friction between the inner wall of the first shaft sleeve and the rotating shaft such that a sliding friction coefficient between the inner wall of the first shaft sleeve and the rotating shaft is less than or equal to a second preset value.

In this embodiment of this application, the thermally conductive lubricating material is added between the inner wall of the first shaft sleeve and the rotating shaft to reduce the friction between the inner wall of the first shaft sleeve and the rotating shaft such that the rotating shaft rotates more smoothly in the first shaft sleeve.

In this case, one or more first through holes are disposed on the first shaft sleeve, and the heat dissipation apparatus further includes one or more first sealing elements. The one or more first sealing elements are configured to seal the one or more first through holes.

It should be noted that a technician may inject the thermally conductive lubricating material between the inner wall of the first shaft sleeve and the rotating shaft through at least one of the one or more first through holes, and then may seal the one or more first through holes using the one or more first sealing elements, to prevent the thermally conductive lubricating material from flowing out.

Further, the heat dissipation apparatus further includes one or more first sealing rings, and one or more first annular grooves are disposed on a sleeve part of the first shaft sleeve in the rotating shaft. The one or more first sealing rings are located in the one or more first annular grooves.

It should be noted that the one or more first sealing rings are configured to seal space between the inner wall of the first shaft sleeve and the rotating shaft, to prevent the thermally conductive lubricating material between the inner wall of the first shaft sleeve and the rotating shaft from flowing out.

In addition, the technician may first sleeve the one or more first sealing rings in the one or more first annular grooves, and then sleeve the first shaft sleeve on a part, in the rotating shaft, that includes the one or more first annular grooves. Then, the technician injects the thermally conductive lubricating material between the inner wall of the first shaft sleeve and the rotating shaft through the at least one first through hole, and then seals the one or more first through holes using the one or more first sealing elements.

In this embodiment of this application, there is a gap between the inner wall of the first shaft sleeve and the rotating shaft, and the gap between the inner wall of the first shaft sleeve and the rotating shaft is sealed using the one or more first sealing rings. In this way, a radial tolerance generated during processing and assembly can be reduced using the gap between the inner wall of the first shaft sleeve and the rotating shaft and the first sealing ring, thereby effectively avoiding a problem such as stagnation or abnormal sound in a rotation process of the first shaft sleeve and the rotating shaft.

The cooling element includes a first cooling plate. A first end of the first cooling plate is connected to the rotating shaft, and a second end of the first cooling plate is in contact with the heat dissipation device in the second folding part.

It should be noted that the first cooling plate is a device configured to continue to transfer, to the heat dissipation device in the second folding part, the heat transferred from the rotating shaft.

The cooling element includes a second cooling plate and a second shaft sleeve. The second shaft sleeve is sleeved on a part, in the rotating shaft, other than a sleeve part of the first shaft sleeve. A first end of the second cooling plate is connected to an outer wall of the second shaft sleeve, and a second end of the second cooling plate is in contact with the heat dissipation device in the second folding part.

It should be noted that the second shaft sleeve may continue to transfer, to the second cooling plate connected to the second shaft sleeve, the heat transferred from the rotating shaft. The second cooling plate is a device configured to continue to transfer, to the heat dissipation device in the second folding part, the heat transferred from the second shaft sleeve.

In this embodiment of this application, an area of contact between the cooling element and the rotating shaft is an area of an inner wall of the second shaft sleeve. In this case, there is a relatively large area for heat transfer from the rotating shaft to the cooling element. Therefore, heat transfer efficiency can be improved, thereby further improving heat dissipation efficiency of the folding device.

In a possible implementation, the inner wall of the second shaft sleeve is connected to the rotating shaft. For example, the inner wall of the second shaft sleeve may be welded to the rotating shaft.

In another possible implementation, there is a gap between the inner wall of the second shaft sleeve and the rotating shaft. In such a condition, when the second shaft sleeve rotates outside the rotating shaft, the rotating shaft, the first shaft sleeve, and the heat collection plate connected to the first shaft sleeve are not driven to rotate. In this way, no impact is exerted on engagement or separation between the first folding part and the second folding part.

In this implementation, a thermally conductive lubricating material may be added between the inner wall of the second shaft sleeve and the rotating shaft.

It should be noted that the thermally conductive lubricating material is thermally conductive, and can reduce friction between the inner wall of the second shaft sleeve and the rotating shaft such that a sliding friction coefficient between the inner wall of the second shaft sleeve and the rotating shaft is less than or equal to a second preset value.

In this embodiment of this application, the thermally conductive lubricating material is added between the inner wall of the second shaft sleeve and the rotating shaft to reduce the friction between the inner wall of the second shaft sleeve and the rotating shaft such that the second shaft sleeve rotates more smoothly outside the rotating shaft.

In this case, one or more second through holes are disposed on the second shaft sleeve, and the heat dissipation apparatus further includes one or more second sealing elements. The one or more second sealing elements are configured to seal the one or more second through holes.

It should be noted that a technician may inject the thermally conductive lubricating material between the inner wall of the second shaft sleeve and the rotating shaft through at least one second through hole, and then may seal the one or more second through holes using the one or more second sealing elements, to prevent the thermally conductive lubricating material from flowing out.

Further, the heat dissipation apparatus further includes one or more second sealing rings, and one or more second annular grooves are disposed on the sleeve part of the second shaft sleeve in the rotating shaft. The one or more second sealing rings are located in the one or more second annular grooves.

It should be noted that the technician may first sleeve the one or more second sealing rings in the one or more second annular grooves, and then sleeve the second shaft sleeve on a part, in the rotating shaft, that includes the one or more second annular grooves. Then, the technician injects the thermally conductive lubricating material between the inner wall of the second shaft sleeve and the rotating shaft through the at least one second through hole, and then seals the one or more second through holes using the one or more second sealing elements.

In this embodiment of this application, there is a gap between the inner wall of the second shaft sleeve and the rotating shaft, and the gap between the inner wall of the second shaft sleeve and the rotating shaft is sealed using the one or more second sealing rings. In this way, a radial tolerance generated during processing and assembly can be reduced using the gap between the inner wall of the second shaft sleeve and the rotating shaft and the second sealing ring, thereby effectively avoiding a problem such as stagnation or abnormal sound in a rotation process of the second shaft sleeve and the rotating shaft.

Further, a groove is disposed on an inner side of a housing of the first folding part, the heat dissipation apparatus further includes a screw and a washer, and a third through hole is disposed on the heat collection plate. The washer is located between the inner side of the housing of the first folding part and the heat collection plate, and a rod part of the screw passes through the third through hole and a through hole of the washer, and then is threaded with an inner wall of the groove.

It should be noted that the screw may limit positions of the housing of the first folding part and the heat collection plate such that there is specific space between the housing of the first folding part and the heat collection plate. The space is used for placing the washer. For example, the screw may be a stepped screw (floating screw).

In addition, the washer is compressible, and can absorb pressure of the housing of the first folding part on the washer and pressure of the heat collection plate on the washer. In this way, the screw and the washer form a floating design. Therefore, a tolerance generated due to deformation during assembly and rotation can be reduced, to ensure reliable engagement and separation.

There are two or more heat collection elements, and/or there are two or more cooling elements.

In this embodiment of this application, when there are two or more heat collection elements, the plurality of heat collection elements may be in contact with heat sources at different positions in the first folding part, or the plurality of heat collection elements may be in contact with a same heat source in the first folding part. In this way, an area of contact with the heat source in the first folding part can be increased, and therefore higher efficiency is achieved in collecting the heat generated by the heat source in the first folding part. When there are two or more cooling elements, the plurality of cooling elements may transfer, to different positions of the heat dissipation device in the second folding part, the heat transferred from the rotating shaft. In this way, an area of contact with the heat dissipation device in the second folding part is increased, and the heat is more evenly distributed in the heat dissipation device in the second folding part, and therefore higher heat dissipation efficiency of the heat dissipation device is achieved.

A side surface of the cooling element is connected to a folding edge in a housing of the second folding part, the folding edge wraps the outer wall of the first shaft sleeve and the rotating shaft, and the folding edge is configured to shield the first shaft sleeve and the rotating shaft when the first folding part and the second folding part are engaged.

In this embodiment of this application, the outer wall of the first shaft sleeve and the rotating shaft are wrapped inside the folding edge in the housing of the second folding part. When the first folding part and the second folding part are engaged, the folding edge may shield the first shaft sleeve and the rotating shaft such that the first shaft sleeve and the rotating shaft are not exposed. In this way, the first shaft sleeve and the rotating shaft can be protected while an appearance is beautified.

The cooling element includes a ferrule, and the ferrule is located in a slot in the second folding part.

It should be noted that the ferrule may be the first cooling plate or the second cooling plate. The ferrule may limit a position of the second folding part. Further, the ferrule may be inserted into the slot in the second folding part. In this case, the position of the second folding part is fixed. In this way, the second folding part and the first folding part may be assembled into the folding device using the heat dissipation apparatus.

Heat conductivity of each of the heat collection element, the rotating shaft, and the cooling element is greater than or equal to 120 watts (W)/(meter (m)·kelvin (K)).

In this embodiment of this application, when the heat conductivity of each of the heat collection element, the rotating shaft, and the cooling element is greater than or equal to 120 W/(m·K), the heat collection element, the rotating shaft, and the cooling element have a relatively good heat-conducting property, thereby achieving a relatively good heat transfer effect.

According to a second aspect, a heat dissipation apparatus is provided. The heat dissipation apparatus includes a heat collection element, a rotating shaft, and a cooling element. The heat collection element includes a heat collection plate and a first shaft sleeve. A first end of the heat collection plate is in contact with a heat source in a first folding part of a folding device, and a second end of the heat collection plate is connected to an outer wall of the first shaft sleeve. The first shaft sleeve is sleeved on the rotating shaft. A first end of the cooling element is in contact with the rotating shaft, and a second end of the cooling element is in contact with a heat dissipation device in a second folding part of the folding device.

Technical effects obtained in the second aspect are similar to technical effects obtained in the first aspect using a corresponding technical means. Details are not described herein again.

The technical solutions provided in this application may bring at least the following beneficial effects.

In a case in which the folding device performs heat dissipation, when the heat source in the first folding part generates heat, the heat collection plate in the heat collection element collects the heat generated by the heat source, the heat collection plate transfers the heat collected from the heat source to the first shaft sleeve in the heat collection element, the first shaft sleeve in the heat collection element then transfers the heat to the rotating shaft, the rotating shaft then transfers the heat to the cooling element, and finally, the cooling element transfers the heat to the heat dissipation device in the second folding part, and the heat dissipation device in the second folding part dissipates the heat to air, to complete heat dissipation for the folding device. The folding device may transfer the heat generated by the heat source in the first folding part to the heat dissipation device in the second folding part. In this way, a heat dissipation region of the heat source is expanded, and a heat dissipation area of the folding device is increased. Therefore, a heat dissipation effect of the folding device is improved.

REFERENCE NUMERALS

100: First folding part; 110: Groove; 200: Second folding part; 300: Heat dissipation apparatus; 310: Heat collection element; 311: Heat collection plate; 3111: First end of the heat collection plate; 3112: Second end of the heat collection plate; 312: First shaft sleeve; 313: First through hole; 314: First sealing element; 315: First sealing ring; 316: First annular groove; 320: Rotating shaft; 330: Cooling element; 331: First end of the cooling element; 332: Second end of the cooling element; 333: First cooling plate; 3331: First end of the first cooling plate; 3332: Second end of the first cooling plate; 334: Second cooling plate; 3341: First end of the second cooling plate; 3342: Second end of the second cooling plate; 335: Second shaft sleeve; 336: Ferrule; 340: Screw; 341: Rod part of the screw; and 350: Washer.

DESCRIPTION OF EMBODIMENTS

To make the objectives, technical solutions, and advantages of this application clearer, the following further describes the implementations of this application in detail with reference to the accompanying drawings.

It should be understood that "a plurality of" in this application means two or more. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, to clearly describe the technical solutions of this application, words such as "first" and "second" are used to distinguish between same items or similar items whose functions are basically the same. A person skilled in the art may understand that the words such as "first" and "second" do not limit a quantity or an execution sequence, and the words such as "first" and "second" do not mean being definitely different either.

Figure 1:
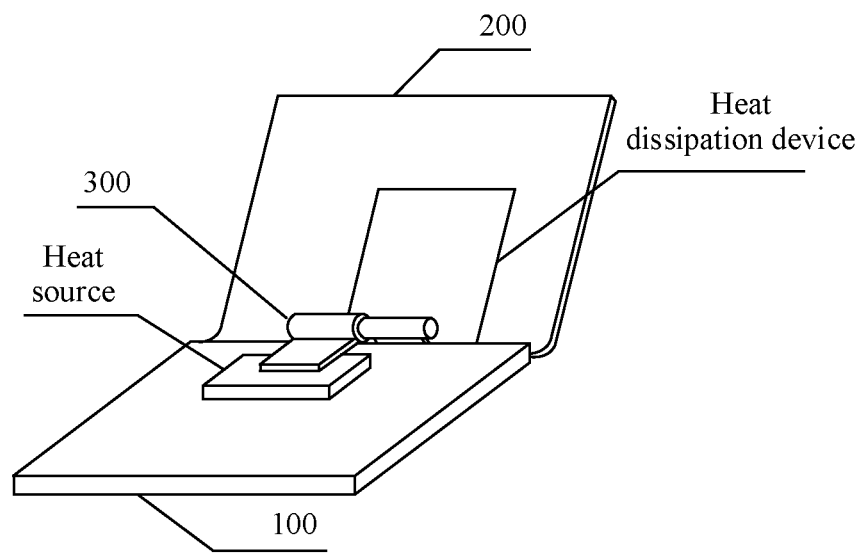
FIG. 1 is a first schematic structural diagram of a folding device according to an embodiment of this application.
Figure 2:
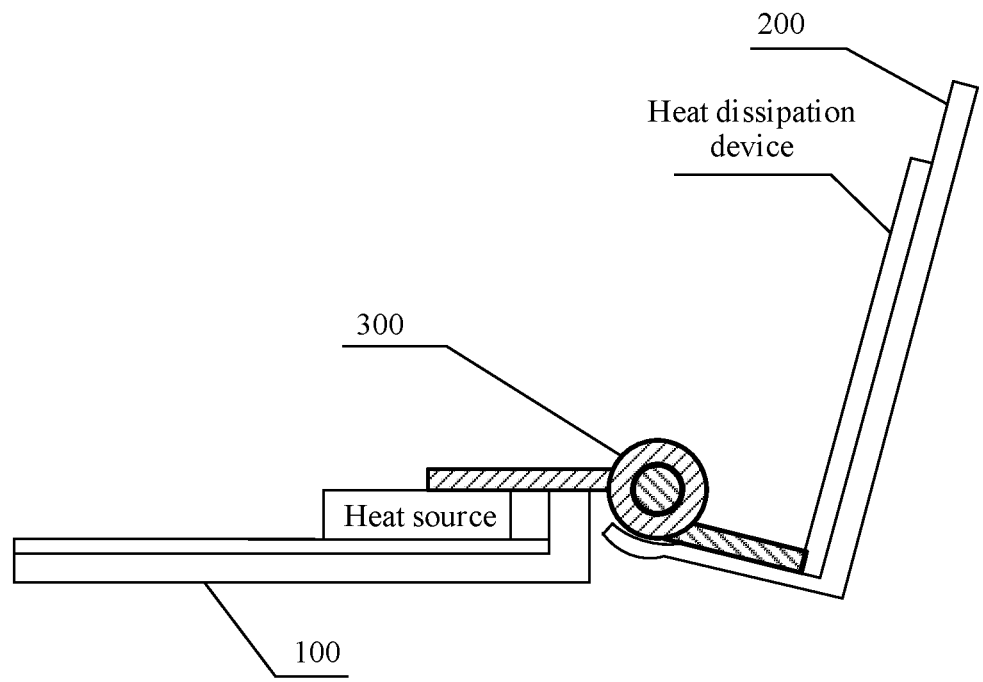
FIG. 2 is a second schematic structural diagram of a folding device according to an embodiment of this application.

FIG. 1 and FIG. 2 are schematic structural diagrams of a folding device according to an embodiment of this application. FIG. 1 is a three-dimensional schematic diagram of a folding device according to an embodiment of this application. FIG. 2 is a left view of a folding device according to an embodiment of this application. Referring to FIG. 1 and FIG. 2, the folding device includes a first folding part 100, a second folding part 200, and a heat dissipation apparatus 300. The first folding part 100 includes a heat source, and the second folding part 200 includes a heat dissipation device.

Figure 3:
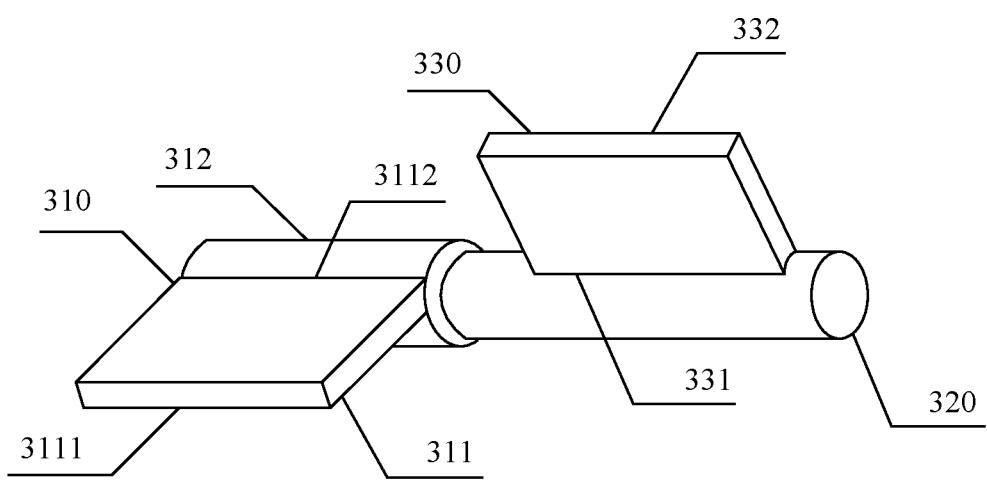
FIG. 3 is a first schematic structural diagram of a heat dissipation apparatus according to an embodiment of this application.

Referring to FIG. 3, the heat dissipation apparatus 300 includes a heat collection element 310, a rotating shaft 320, and a cooling element 330. The heat collection element 310 includes a heat collection plate 311 and a first shaft sleeve 312. A first end 3111 of the heat collection plate 311 is in contact with the heat source in the first folding part 100, and a second end 3112 of the heat collection plate 311 is connected to an outer wall of the first shaft sleeve 312. The first shaft sleeve 312 is sleeved on the rotating shaft 320. A first end 331 of the cooling element 330 is in contact with the rotating shaft 320, and a second end 332 of the cooling element 330 is in contact with the heat dissipation device in the second folding part 200.

It should be noted that the heat collection element 310 is a device configured to collect heat generated by the heat source in the first folding part 100 and transfer the heat to the rotating shaft 320. The heat collection plate 311 may collect the heat generated by the heat source in the first folding part 100, and transfer the heat to the first shaft sleeve 312 connected to the heat collection plate 311. The first shaft sleeve 312 is sleeved on the rotating shaft 320, and therefore the first shaft sleeve 312 may continue to transfer, to the rotating shaft 320, the heat transferred from the heat collection plate 311. The first end 3111 of the heat collection plate 311 may be in direct contact with the heat source in the first folding part 100, or may be bonded together using thermally conductive adhesive. Certainly, the first end 3111 of the heat collection plate 311 may be in contact with the heat source in the first folding part 100 in another manner. This is not limited in this embodiment of this application. A shape, a size, and the like of the heat collection element 310 may be set based on a use requirement. This is not limited in this embodiment of this application.

It should be noted that there is a gap between an inner wall of the first shaft sleeve 312 and the rotating shaft 320. That is, a difference between an inner diameter of the first shaft sleeve 312 and a diameter of the rotating shaft 320 may be greater than or equal to a first preset value. In such a condition, when the rotating shaft 320 rotates in the first shaft sleeve 312, the first shaft sleeve 312 and the heat collection plate 311 connected to the first shaft sleeve 312 are not driven to rotate. In this way, no impact is exerted on engagement or separation between the first folding part 100 and the second folding part 200. The first preset value may be preset, and the first preset value may be a value greater than 0. For example, the first preset value may be 1 mm (millimeter) or 2 mm.

In addition, the rotating shaft 320 is a cylindrical device configured to continue to transfer, to the cooling element 330, the heat transferred from the heat collection element 310, and the rotating shaft 320 may rotate in the first shaft sleeve 312.

Furthermore, the cooling element 330 is a device configured to continue to transfer, to the heat dissipation device in the second folding part 200, the heat transferred from the rotating shaft 320. A shape, a size, and the like of the cooling element 330 may be set based on a use requirement. This is not limited in this embodiment of this application.

It should be noted that in the folding device, the first folding part 100 and the second folding part 200 are located on two sides of the rotating shaft 320. For example, the folding device may be a non-planar device such as a conventional notebook computer, a two-in-one notebook computer, a wearable flexible device, or a foldable mobile phone. The rotating shaft 320 may rotate in the first shaft sleeve 312, and therefore rotation of the heat collection element 310 does not affect rotation of the cooling element 330. That is, the heat collection element 310 and the cooling element 330 may be separately rotated such that the heat collection plate 311 is close to or away from the cooling element 330, to drive the first folding part 100 and the second folding part 200 to engage or separate.

In addition, the heat source in the first folding part 100 may be a heat generation device that generates heat, a device that transfers heat generated by a heat generation device, or a device that dissipates heat generated by a heat generation device. For example, the heat source may be a heat generation device such as a CPU, a mainboard, or a hard disk, or may be a device such as a heat pipe module that transfers heat generated by a heat generation device, or may be a device such as a heat pipe or a graphite sheet that dissipates heat generated by a heat generation device.

Furthermore, the heat dissipation device in the second folding part 200 is a device configured to dissipate, to air, the heat transferred from the cooling element 330. The heat dissipation device may be a housing of the second folding part 200, or may be a cooling device with relatively high heat conductivity, such as a copper film or a graphite film, disposed in the second folding part 200. This is not limited in this embodiment of this application.

Further, in a case in which the folding device performs heat dissipation, when the heat source in the first folding part 100 generates heat, the heat collection plate 311 in the heat collection element 310 collects the heat generated by the heat source, the heat collection plate 311 transfers the heat collected from the heat source to the first shaft sleeve 312 in the heat collection element 310, the first shaft sleeve 312 then transfers the heat to the rotating shaft 320, the rotating shaft 320 then transfers the heat to the cooling element 330, and finally, the cooling element 330 transfers the heat to the heat dissipation device in the second folding part 200, and the heat dissipation device in the second folding part 200 dissipates the heat to the air, to complete heat dissipation for the folding device. In this case, the folding device may transfer the heat generated by the heat source in the first folding part 100 to the heat dissipation device in the second folding part 200. In this way, a heat dissipation region of the heat source is expanded, and a heat dissipation area of the folding device is increased. Therefore, a heat dissipation effect of the folding device is improved.

Figure 4:
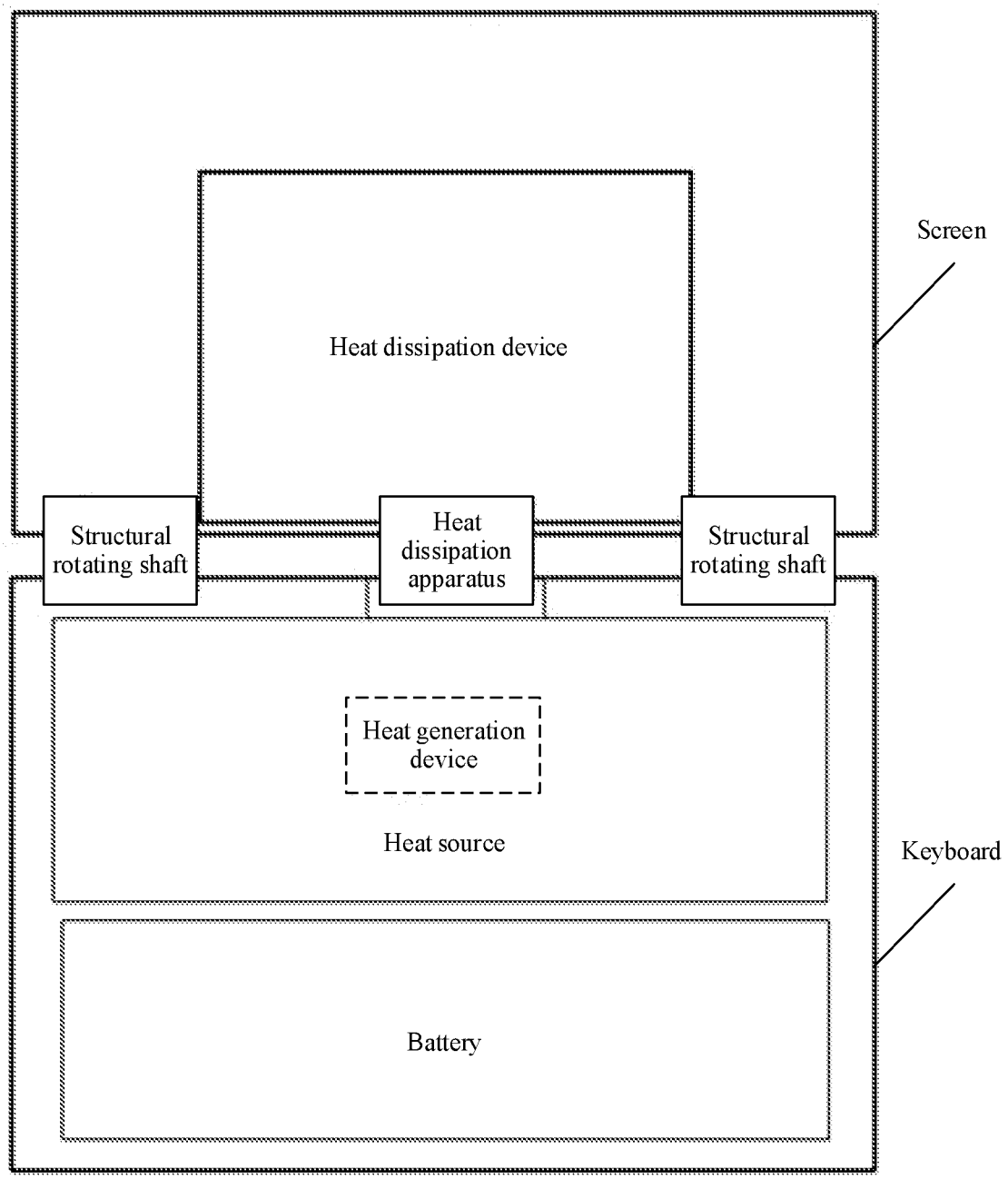
FIG. 4 is a third schematic structural diagram of a folding device according to an embodiment of this application.

For example, as shown in FIG. 4, the folding device is a conventional notebook computer, the first folding part 100 of the folding device is a keyboard, and the second folding part 200 of the folding device is a screen. A heat dissipation apparatus 300 and two structural rotating shafts are disposed between the keyboard and the screen, and the keyboard and the screen may be engaged or separated using the heat dissipation apparatus 300 and the two structural rotating shafts. Heat generated by a heat source in the keyboard may be transferred to a heat dissipation device in the screen using the heat dissipation apparatus 300. Therefore, a heat path between the keyboard and the screen is established, thereby effectively expanding a heat dissipation area and improving an overall heat dissipation capability.

Figure 5:
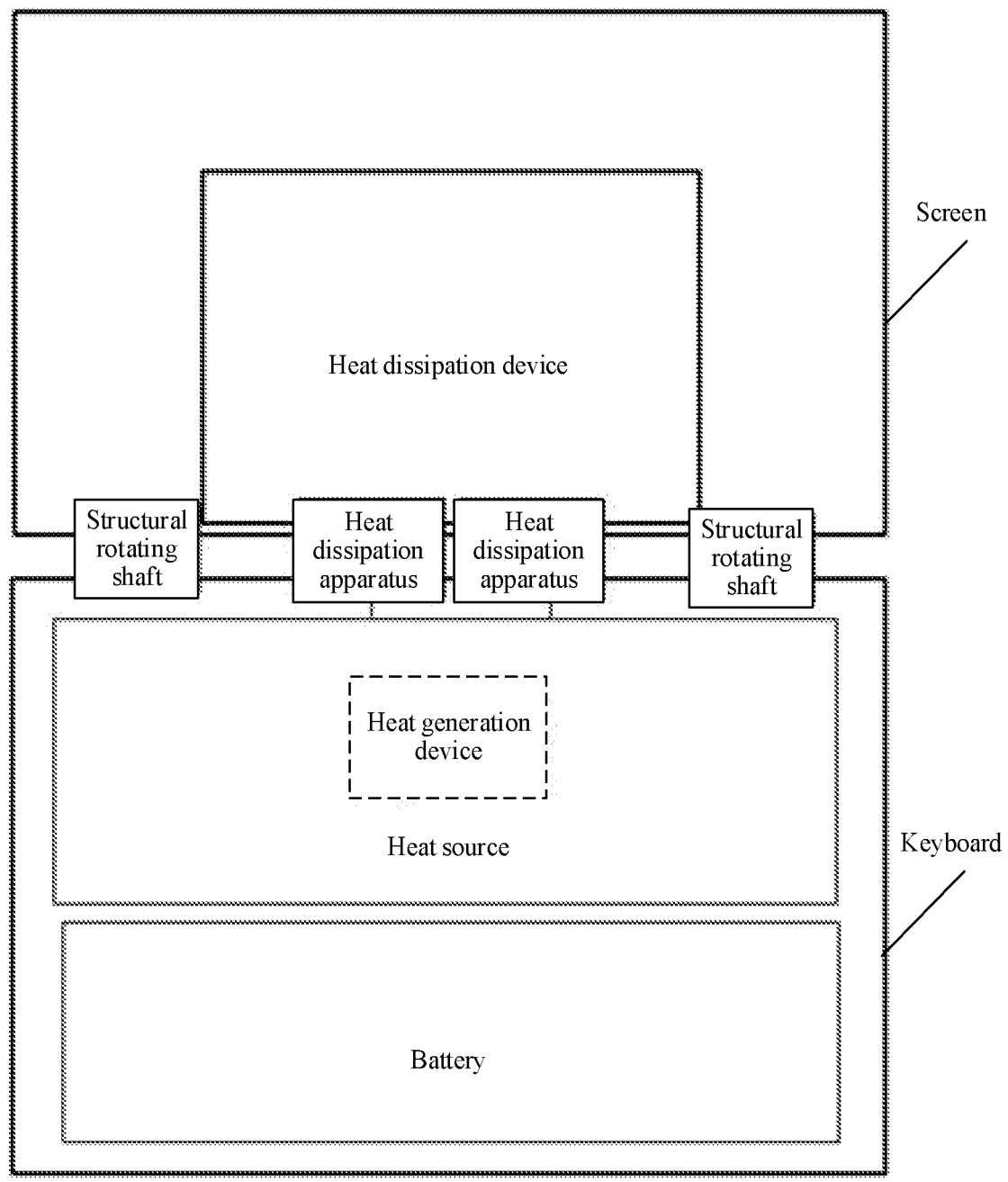
FIG. 5 is a fourth schematic structural diagram of a folding device according to an embodiment of this application.

It should be noted that the folding device may include one or more heat dissipation apparatuses 300 based on a space size and a heat dissipation requirement of the folding device. For example, as shown in FIG. 5, the folding device is a conventional notebook computer, the first folding part 100 of the folding device is a keyboard, and the second folding part 200 of the folding device is a screen. Two heat dissipation apparatuses 300 and two structural rotating shafts are disposed between the keyboard and the screen, and the keyboard and the screen may be engaged or separated using the two heat dissipation apparatuses 300 and the two structural rotating shafts.

To make the heat collection element 310, the rotating shaft 320, and the cooling element 330 have a better heat-conducting property, each of the heat collection element 310, the rotating shaft 320, and the cooling element 330 may be made of a material with high heat conductivity. That is, heat conductivity of each of the heat collection element 310, the rotating shaft 320, and the cooling element 330 may be greater than or equal to 120 W/(m·K). For example, each of the heat collection element 310, the rotating shaft 320, and the cooling element 330 may be made of a material with high heat conductivity such as copper or graphite.

To improve a heat dissipation effect of the folding device, there may be two or more heat collection elements 310, and/or there may be two or more cooling elements 330. In this way, unilateral, bilateral, or multilateral heat transfer can be implemented.

It should be noted that when there are two or more heat collection elements 310, the plurality of heat collection elements 310 may be in contact with heat sources at different positions in the first folding part 100, or the plurality of heat collection elements 310 may be in contact with a same heat source in the first folding part 100. In this way, an area of contact with the heat source in the first folding part 100 can be increased, and therefore higher efficiency is achieved in collecting the heat generated by the heat source in the first folding part 100.

In addition, when there are two or more cooling elements 330, the plurality of cooling elements 330 may transfer, to different positions of the heat dissipation device in the second folding part 200, the heat transferred from the rotating shaft 320. In this way, an area of contact with the heat dissipation device in the second folding part 200 is increased, and the heat is more evenly distributed in the heat dissipation device in the second folding part 200, and therefore higher heat dissipation efficiency of the folding device is achieved.

Figure 6:
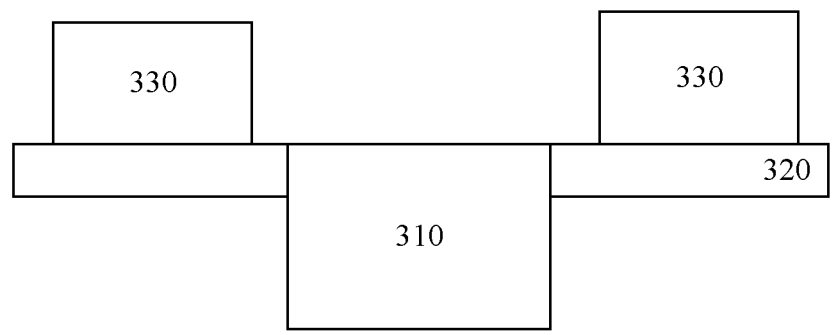
FIG. 6 is a first schematic diagram of positions of a heat collection element and a cooling element according to an embodiment of this application.
Figure 7:
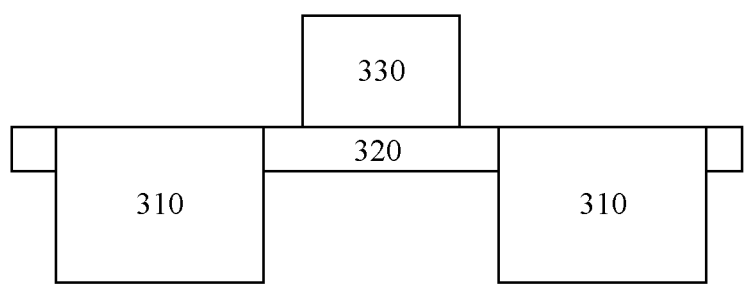
FIG. 7 is a second schematic diagram of positions of a heat collection element and a cooling element according to an embodiment of this application.
Figure 8:
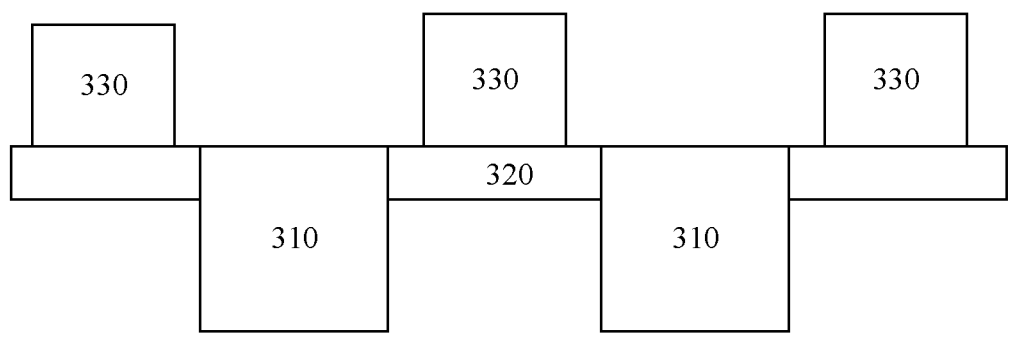
FIG. 8 is a third schematic diagram of positions of a heat collection element and a cooling element according to an embodiment of this application.

Furthermore, positions of the heat collection element 310 and the cooling element 330 may be set based on a requirement. For example, as shown in FIG. 6, when there is one heat collection element 310 and there are two or more cooling elements 330, the one heat collection element 310 may be located between the at least two cooling elements 330. As shown in FIG. 7, when there are two or more heat collection elements 310 and there is one cooling element 330, the one cooling element 330 may be located between the at least two heat collection elements 310. As shown in FIG. 8, when there are two or more heat collection elements 310 and there are two or more cooling elements 330, the at least two heat collection elements 310 and the at least two cooling elements 330 may be arranged at intervals.

To reduce friction between the inner wall of the first shaft sleeve 312 and the rotating shaft 320 to enable the rotating shaft 320 to rotate more smoothly in the first shaft sleeve 312, a thermally conductive lubricating material may be added between the inner wall of the first shaft sleeve 312 and the rotating shaft 320.

It should be noted that the thermally conductive lubricating material is thermally conductive, and can reduce the friction between the inner wall of the first shaft sleeve 312 and the rotating shaft 320 such that a sliding friction coefficient between the inner wall of the first shaft sleeve 312 and the rotating shaft 320 is less than or equal to a second preset value. The second preset value may be preset, and the second preset value may be set to a relatively small value. For example, the second preset value may be 0.1. A type of the thermally conductive lubricating material may be preset based on a use requirement. This is not limited in this embodiment of this application. For example, the thermally conductive lubricating material may be thermally conductive oil.

Figure 9:
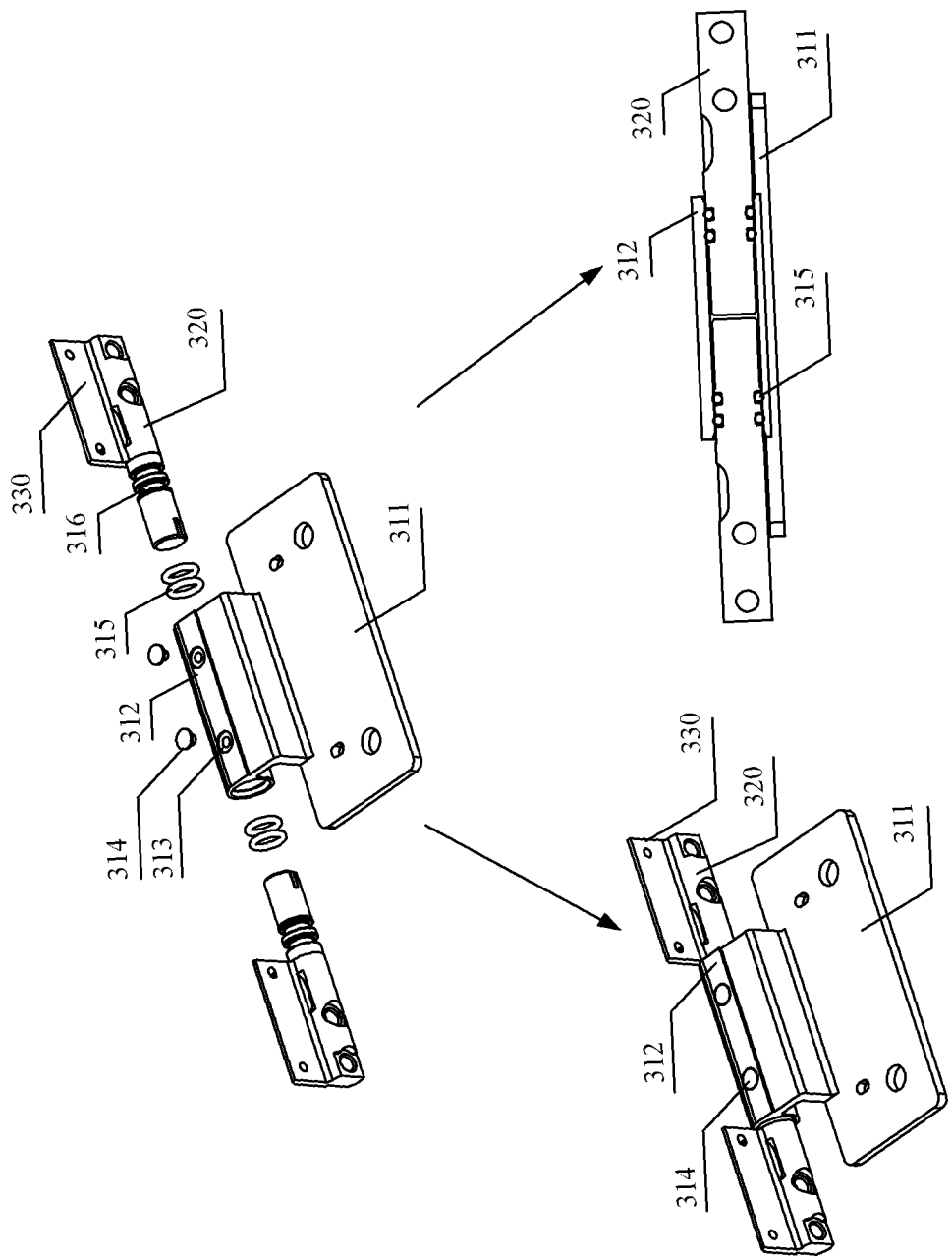
FIG. 9 is a second schematic structural diagram of a heat dissipation apparatus according to an embodiment of this application.

In this case, referring to FIG. 9, one or more first through holes 313 may be disposed on the first shaft sleeve 312, and the heat dissipation apparatus 300 may further include one or more first sealing elements 314. The one or more first sealing elements 314 are configured to seal the one or more first through holes 313.

It should be noted that at least one of the one or more first through holes 313 is used for injecting the thermally conductive lubricating material. For example, a technician may inject the thermally conductive lubricating material between the inner wall of the first shaft sleeve 312 and the rotating shaft 320 through the at least one of the one or more first through holes 313.

It should be noted that when a plurality of first through holes 313 are disposed on the first shaft sleeve 312, the plurality of first through holes 313 may have a same aperture or different apertures. In addition, some of the plurality of first through holes 313 may be used for injecting the thermally conductive lubricating material, and the other first through holes 313 may be used for discharging the thermally conductive lubricating material. For example, the technician may inject the thermally conductive lubricating material between the inner wall of the first shaft sleeve 312 and the rotating shaft 320 through some of the plurality of first through holes 313. When the heat dissipation apparatus 300 does not need to be used, the technician may discharge the thermally conductive lubricating material between the inner wall of the first shaft sleeve 312 and the rotating shaft 320 through the other first through holes 313.

In addition, each of the one or more first sealing elements 314 is configured to seal one first through hole 313. A shape of the first sealing element 314 is similar to a shape of the first through hole 313. For example, the first sealing element 314 may be glue, a copper plug, a screw, or a rivet. This is not limited in this embodiment of this application. For example, after injecting the thermally conductive lubricating material between the inner wall of the first shaft sleeve 312 and the rotating shaft 320 through the at least one first through hole 313, the technician may seal the one or more first through holes 313 using the one or more first sealing elements 314, to prevent the thermally conductive lubricating material from flowing out.

Further, referring to FIG. 9, the heat dissipation apparatus 300 may further include one or more first sealing rings 315, one or more first annular grooves 316 are disposed on a sleeve part of the first shaft sleeve 312 in the rotating shaft 320, and the one or more first sealing rings 315 are located in the one or more first annular grooves 316.

It should be noted that the one or more first sealing rings 315 are configured to seal space between the inner wall of the first shaft sleeve 312 and the rotating shaft 320, to prevent the thermally conductive lubricating material between the inner wall of the first shaft sleeve 312 and the rotating shaft 320 from flowing out. In actual application, the one or more first annular grooves 316 may be disposed on parts that are close to two ends of the sleeve part of the first shaft sleeve 312 in the rotating shaft 320, to more effectively prevent the thermally conductive lubricating material between the inner wall of the first shaft sleeve 312 and the rotating shaft 320 from flowing out.

For example, the technician may first sleeve the one or more first sealing rings 315 in the one or more first annular grooves 316, and then sleeve the first shaft sleeve 312 in a part, in the rotating shaft 320, that includes the one or more first annular grooves 316. Then, the technician injects the thermally conductive lubricating material between the inner wall of the first shaft sleeve 312 and the rotating shaft 320 through the at least one first through hole 313, and then seals the one or more first through holes 313 using the one or more first sealing elements 314.

It should be noted that in this embodiment of this application, there is a gap between the inner wall of the first shaft sleeve 312 and the rotating shaft 320, and the gap between the inner wall of the first shaft sleeve 312 and the rotating shaft 320 is sealed using the one or more first sealing rings 315. In this way, a radial tolerance generated during processing and assembly can be reduced using the gap between the inner wall of the first shaft sleeve 312 and the rotating shaft 320 and the first sealing ring 315, thereby effectively avoiding a problem such as stagnation or abnormal sound in a rotation process of the first shaft sleeve 312 and the rotating shaft 320.

The cooling element 330 may be of either of the following two structures.

Figure 10:
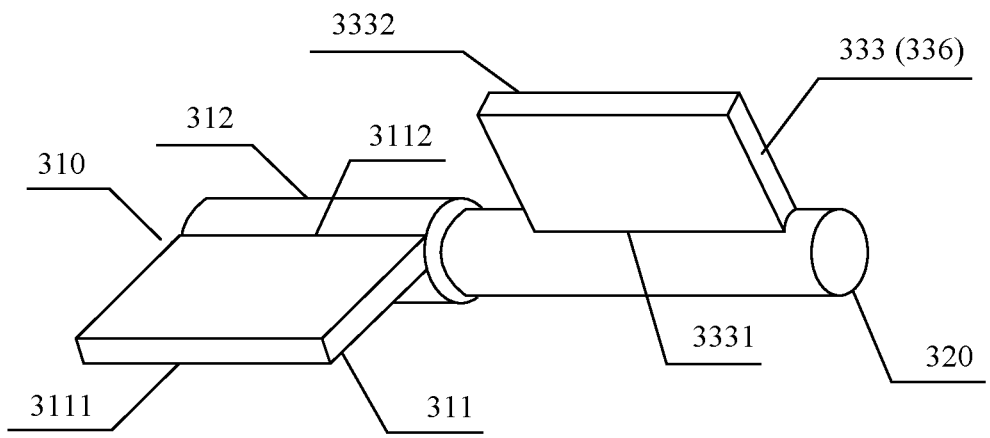
FIG. 10 is a third schematic structural diagram of a heat dissipation apparatus according to an embodiment of this application.

In a first structure, referring to FIG. 10, the cooling element 330 includes a first cooling plate 333. A first end 3331 of the first cooling plate 333 is connected to the rotating shaft 320, and a second end 3332 of the first cooling plate 333 is in contact with the heat dissipation device in the second folding part 200.

It should be noted that the first cooling plate 333 is a device configured to continue to transfer, to the heat dissipation device in the second folding part 200, the heat transferred from the rotating shaft 320.

In this case, a process in which the first folding part 100 and the second folding part 200 are engaged or separated may be as follows. The second folding part 200 is rotated to drive the first cooling plate 333 in contact with the heat dissipation device in the second folding part 200 to rotate, and when the first cooling plate 333 rotates, the rotating shaft 320 connected to the first cooling plate 333 may be driven to rotate in the first shaft sleeve 312. In this way, the first cooling plate 333 is close to or away from the heat collection plate 311, and therefore the second folding part 200 is close to or away from the first folding part 100. Alternatively, the first folding part 100 may be rotated to drive the heat collection plate 311 in contact with the heat source in the first folding part 100 to rotate, and when the heat collection plate 311 rotates, the first shaft sleeve 312 connected to the heat collection plate 311 may be driven to rotate outside the rotating shaft 320. In this way, the heat collection plate 311 is close to or away from the first cooling plate 333, and therefore the first folding part 100 is close to or away from the second folding part 200. In this way, the first folding part 100 and the second folding part 200 can be engaged or separated.

Figure 11:
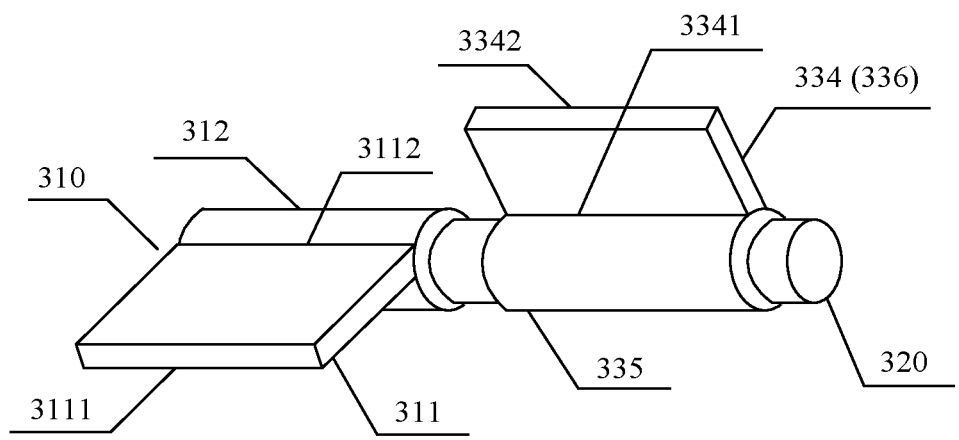
FIG. 11 is a fourth schematic structural diagram of a heat dissipation apparatus according to an embodiment of this application.

In a second structure, referring to FIG. 11, the cooling element 330 includes a second cooling plate 334 and a second shaft sleeve 335. The second shaft sleeve 335 is sleeved on a part, in the rotating shaft 320, other than a sleeve part of the first shaft sleeve 312, a first end 3341 of the second cooling plate 334 is connected to an outer wall of the second shaft sleeve 335, and a second end 3342 of the second cooling plate 334 is in contact with the heat dissipation device in the second folding part 200.

It should be noted that the second shaft sleeve 335 may continue to transfer, to the second cooling plate 334 connected to the second shaft sleeve 335, the heat transferred from the rotating shaft 320. The second cooling plate 334 is a device configured to continue to transfer, to the heat dissipation device in the second folding part 200, the heat transferred from the second shaft sleeve 335. In this case, an area of contact between the cooling element 330 and the rotating shaft 320 is an area of an inner wall of the second shaft sleeve 335. In this case, there is a relatively large area for heat transfer from the rotating shaft 320 to the cooling element 330. Therefore, heat transfer efficiency can be improved, thereby further improving heat dissipation efficiency of the folding device.

In a possible implementation, the inner wall of the second shaft sleeve 335 is connected to the rotating shaft 320. For example, the inner wall of the second shaft sleeve 335 may be welded to the rotating shaft 320.

In this implementation, a process in which the first folding part 100 and the second folding part 200 are engaged or separated may be as follows. The second folding part 200 is rotated to drive the second cooling plate 334 in contact with the heat dissipation device in the second folding part 200 to rotate, when the second cooling plate 334 rotates, the second shaft sleeve 335 connected to the second cooling plate 334 may be driven to rotate, and when the second shaft sleeve 335 rotates, the rotating shaft 320 connected to the inner wall of the second shaft sleeve 335 may be driven to rotate. In this way, the second cooling plate 334 is close to or away from the heat collection plate 311, and therefore the second folding part 200 is close to or away from the first folding part 100. Alternatively, the first folding part 100 may be rotated to drive the heat collection plate 311 in contact with the heat source in the first folding part 100 to rotate, and when the heat collection plate 311 rotates, the first shaft sleeve 312 connected to the heat collection plate 311 may be driven to rotate outside the rotating shaft 320. In this way, the heat collection plate 311 is close to or away from the second cooling plate 334, and therefore the first folding part 100 is close to or away from the second folding part 200. In this way, the first folding part 100 and the second folding part 200 can be engaged or separated.

In another possible implementation, there is a gap between the inner wall of the second shaft sleeve 335 and the rotating shaft 320. That is, a difference between an inner diameter of the second shaft sleeve 335 and a diameter of the rotating shaft 320 may be greater than or equal to a first preset value. In such a condition, when the second shaft sleeve 335 rotates outside the rotating shaft 320, the rotating shaft 320, the first shaft sleeve 312, and the heat collection plate 311 connected to the first shaft sleeve 312 are not driven to rotate. In this way, no impact is exerted on engagement or separation between the first folding part 100 and the second folding part 200.

In this implementation, a process in which the first folding part 100 and the second folding part 200 are engaged or separated may be as follows. The second folding part 200 is rotated to drive the second cooling plate 334 in contact with the heat dissipation device in the second folding part 200 to rotate, and when the second cooling plate 334 rotates, the second shaft sleeve 335 connected to the second cooling plate 334 may be driven to rotate outside the rotating shaft 320. In this way, the second cooling plate 334 is close to or away from the heat collection plate 311, and therefore the second folding part 200 is close to or away from the first folding part 100. Alternatively, the first folding part 100 may be rotated to drive the heat collection plate 311 in contact with the heat source in the first folding part 100 to rotate, and when the heat collection plate 311 rotates, the first shaft sleeve 312 connected to the heat collection plate 311 may be driven to rotate outside the rotating shaft 320. In this way, the heat collection plate 311 is close to or away from the second cooling plate 334, and therefore the first folding part 100 is close to or away from the second folding part 200. In this way, the first folding part 100 and the second folding part 200 can be engaged or separated.

In this case, to reduce friction between the inner wall of the second shaft sleeve 335 and the rotating shaft 320 to enable the second shaft sleeve 335 to rotate more smoothly outside the rotating shaft 320, a thermally conductive lubricating material may be added between the inner wall of the second shaft sleeve 335 and the rotating shaft 320.

It should be noted that the thermally conductive lubricating material is thermally conductive, and can reduce the friction between the inner wall of the second shaft sleeve 335 and the rotating shaft 320 such that a sliding friction coefficient between the inner wall of the second shaft sleeve 335 and the rotating shaft 320 is less than or equal to a second preset value. A type of the thermally conductive lubricating material may be preset based on a use requirement. This is not limited in this embodiment of this application. For example, the thermally conductive lubricating material may be thermally conductive oil.

In this case, one or more second through holes may be disposed on the second shaft sleeve 335, and the heat dissipation apparatus 300 may further include one or more second sealing elements. The one or more second sealing elements are configured to seal the one or more second through holes.

It should be noted that at least one of the one or more second through holes is used for injecting the thermally conductive lubricating material. For example, a technician may inject the thermally conductive lubricating material between the inner wall of the second shaft sleeve 335 and the rotating shaft 320 through the at least one of the one or more second through holes.

It should be noted that when a plurality of second through holes are disposed on the second shaft sleeve 335, the plurality of second through holes may have a same aperture or different apertures. In addition, some of the plurality of second through holes may be used for injecting the thermally conductive lubricating material, and the other second through holes may be used for discharging the thermally conductive lubricating material. For example, the technician may inject the thermally conductive lubricating material between the inner wall of the second shaft sleeve 335 and the rotating shaft 320 through some of the plurality of second through holes. When the heat dissipation apparatus 300 does not need to be used, the technician may discharge the thermally conductive lubricating material between the inner wall of the second shaft sleeve 335 and the rotating shaft 320 through the other second through holes.

In addition, each of the one or more second sealing elements is configured to seal one second through hole. A shape of the second sealing element is similar to a shape of the second through hole. For example, the second sealing element may be glue, a copper plug, a screw, or a rivet. This is not limited in this embodiment of this application. For example, after injecting the thermally conductive lubricating material between the inner wall of the second shaft sleeve 335 and the rotating shaft 320 through the at least one second through hole, the technician may seal the one or more second through holes using the one or more second sealing elements, to prevent the thermally conductive lubricating material from flowing out.

Further, the heat dissipation apparatus 300 may further include one or more second sealing rings, and one or more second annular grooves are disposed on the sleeve part of the second shaft sleeve 335 in the rotating shaft 320. The one or more second sealing rings are located in the one or more second annular grooves.

It should be noted that the one or more second sealing rings are configured to seal space between the inner wall of the second shaft sleeve 335 and the rotating shaft 320, to prevent the thermally conductive lubricating material between the inner wall of the second shaft sleeve 335 and the rotating shaft 320 from flowing out. In actual application, the one or more second annular grooves may be disposed on parts that are close to two ends of the sleeve part of the second shaft sleeve 335 in the rotating shaft 320, to more effectively prevent the thermally conductive lubricating material between an inner wall of the second shaft sleeve 335 and the rotating shaft 320 from flowing out.

For example, the technician may first sleeve the one or more second sealing rings in the one or more second annular grooves, and then sleeve the second shaft sleeve 335 on a part, in the rotating shaft 320, that includes the one or more second annular grooves. Then, the technician injects the thermally conductive lubricating material between the inner wall of the second shaft sleeve 335 and the rotating shaft 320 through the at least one second through hole, and then seals the one or more second through holes using the one or more second sealing elements.

It should be noted that in this embodiment of this application, there is a gap between the inner wall of the second shaft sleeve 335 and the rotating shaft 320, and the gap between the inner wall of the second shaft sleeve 335 and the rotating shaft 320 is sealed using the one or more second sealing rings. In this way, a radial tolerance generated during processing and assembly can be reduced using the gap between the inner wall of the second shaft sleeve 335 and the rotating shaft 320 and the second sealing ring, thereby effectively avoiding a problem such as stagnation or abnormal sound in a rotation process of the second shaft sleeve 335 and the rotating shaft 320.

Figure 12:
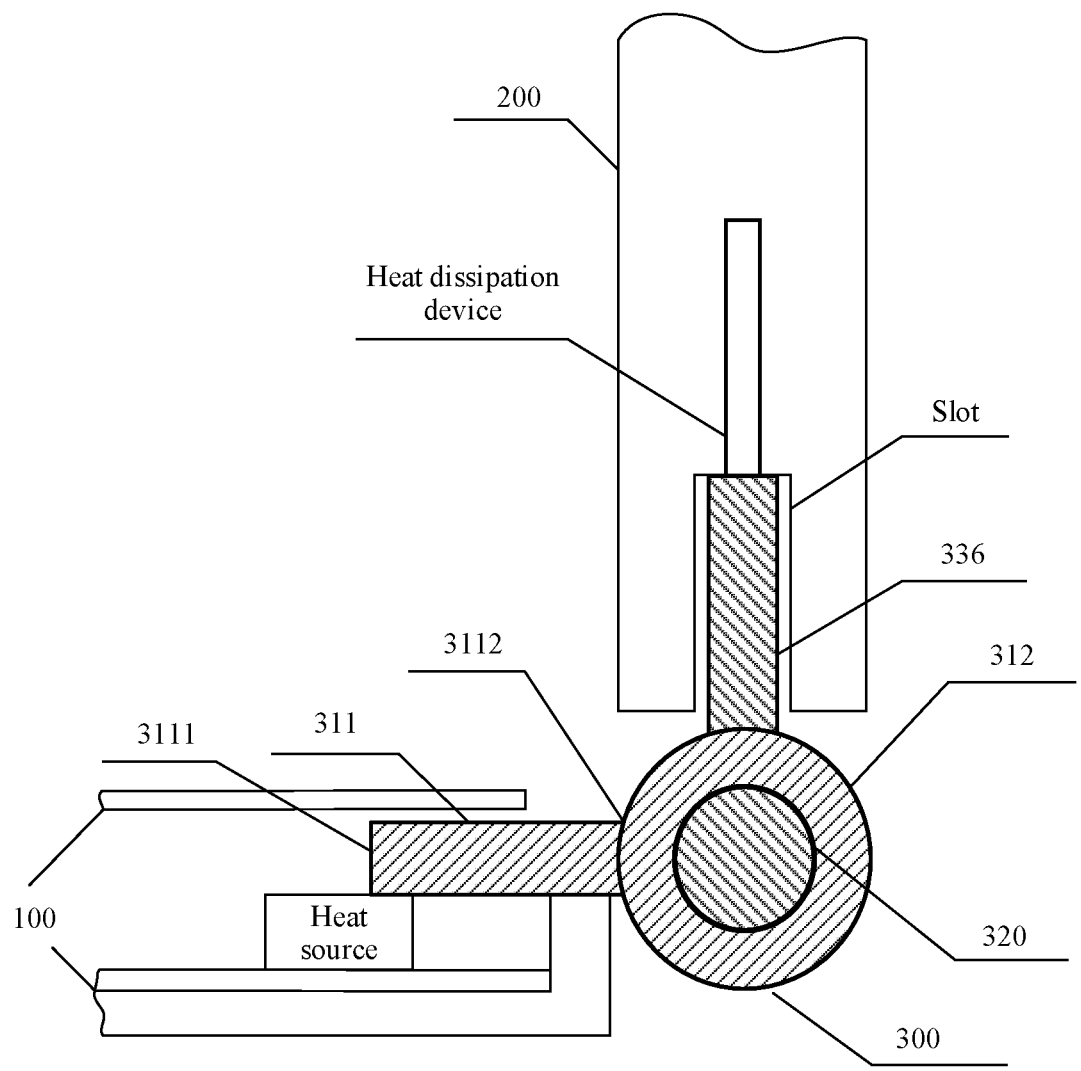
FIG. 12 is a fifth schematic structural diagram of a folding device according to an embodiment of this application.

Referring to FIG. 12, the cooling element 330 includes a ferrule 336, and the ferrule 336 is located in a slot in the second folding part 200.

It should be noted that after being inserted into the slot in the second folding part 200, the ferrule 336 may be in contact with the heat dissipation device in the second folding part 200, to implement heat transfer. The ferrule 336 may be the first cooling plate 333 in the first structure of the cooling element 330, or may be the second cooling plate 334 in the second structure of the cooling element 330. The ferrule 336 may limit a position of the second folding part 200. Further, the ferrule 336 may be inserted into the slot in the second folding part 200. In this case, the position of the second folding part 200 is fixed. In this way, the second folding part 200 and the first folding part 100 may be assembled into the folding device using the heat dissipation apparatus 300.

Figure 13:
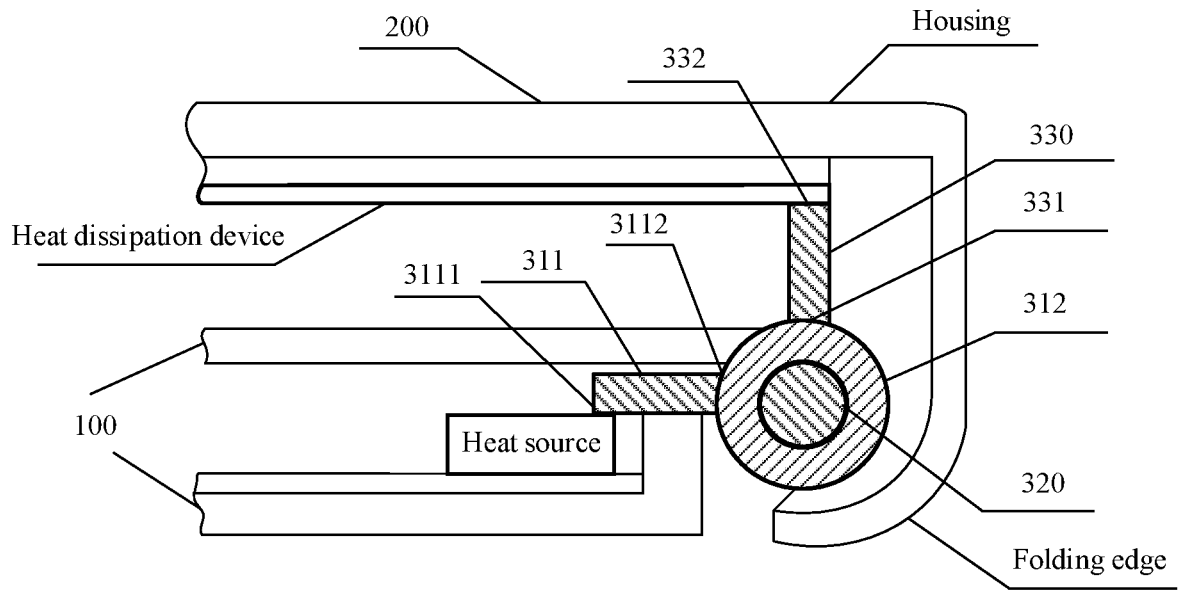
FIG. 13 is a sixth schematic structural diagram of a folding device according to an embodiment of this application.

Referring to FIG. 13, when the first folding part 100 and the second folding part 200 are engaged, to prevent the rotating shaft 320 and the first shaft sleeve 312 from being exposed in a gap between the first folding part 100 and the second folding part 200, a side surface of the cooling element 330 is connected to a folding edge in a housing of the second folding part 200. The folding edge wraps the outer wall of the first shaft sleeve 312 and the rotating shaft 320, and the folding edge is configured to shield the first shaft sleeve 312 and the rotating shaft 320 when the first folding part 100 and the second folding part 200 are engaged.

It should be noted that the outer wall of the first shaft sleeve 312 and the rotating shaft 330 are wrapped inside the folding edge in the housing of the second folding part 200. When the first folding part 100 and the second folding part 200 are engaged, the folding edge may shield the first shaft sleeve 312 and the rotating shaft 320 such that the first shaft sleeve 312 and the rotating shaft 320 are not exposed. In this way, the first shaft sleeve 312 and the rotating shaft 320 can be protected while an appearance is beautified. In addition, in this case, the folding edge in the housing of the second folding part 200 may be directly used as the heat dissipation device in the second folding part 200. Certainly, the heat dissipation device may alternatively be separately added in the second folding part 200. This is not limited in this embodiment of this application.

It should be noted that in actual application, to avoid a problem such as stagnation or abnormal sound in the process in which the first folding part 100 and the second folding part 200 of the folding device are engaged or separated, the structural rotating shaft and the heat dissipation apparatus 300 of the folding device need to be coaxially installed. In this case, when the side surface of the cooling element 330 in the heat dissipation apparatus 300 is connected to the folding edge in the housing of the second folding part 200, some devices in the structural rotating shaft of the folding device may also be connected to the folding edge in the housing of the second folding part 200, to reduce an assembly tolerance.

Figure 14:
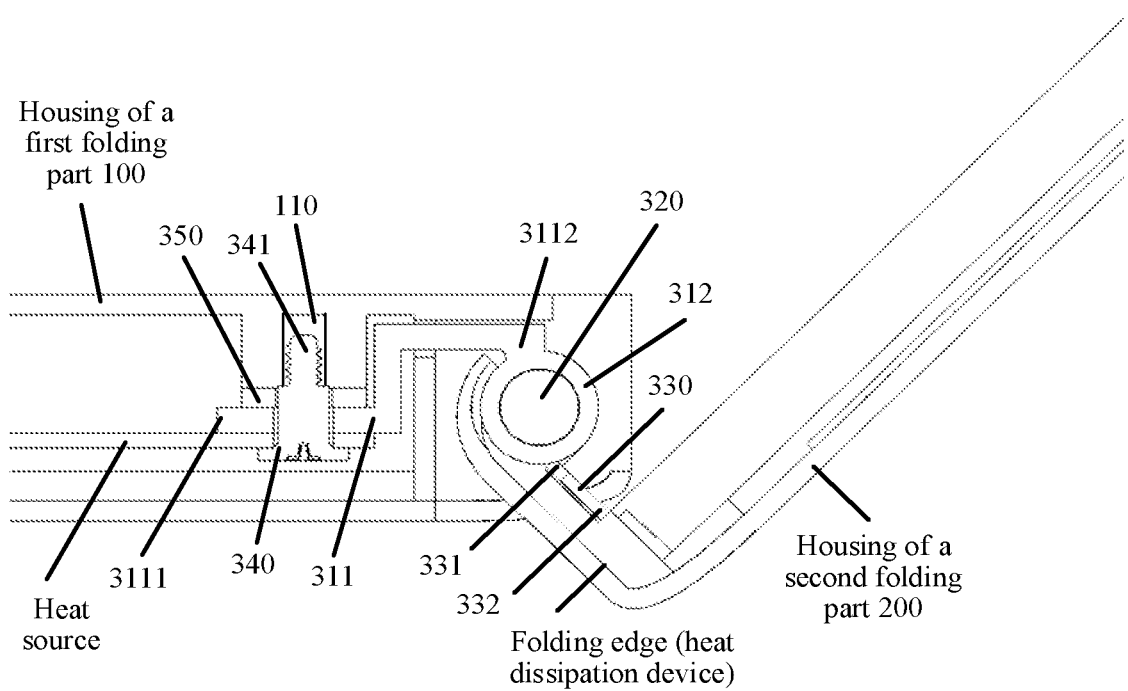
FIG. 14 is a seventh schematic structural diagram of a folding device according to an embodiment of this application.

Further, referring to FIG. 14, a groove 110 is disposed on an inner side of a housing of the first folding part 100, the heat dissipation apparatus 300 further includes a screw 340 and a washer 350, and a third through hole is disposed on the heat collection plate 311. The washer 350 is located between the inner side of the housing of the first folding part 100 and the heat collection plate 311. A rod part 341 of the screw 340 passes through the third through hole and a through hole of the washer 350, and then is threaded with an inner wall of the groove 110.

It should be noted that the rod part 341 of the screw 340 is provided with an outer thread, and the inner wall of the groove 110 is provided with an inner thread. Therefore, the rod part 341 of the screw 340 can be threaded with the inner wall of the groove 110.

In addition, the screw 340 may limit positions of the housing of the first folding part 100 and the heat collection plate 311 such that there is specific space between the housing of the first folding part 100 and the heat collection plate 311. The space is used for placing the washer 350.

For example, the screw 340 may be a stepped screw (floating screw). The stepped screw may include a head, a step, and a rod part. A length of the step of the stepped screw is greater than a length of the third through hole, and a diameter of the step of the stepped screw is greater than a diameter of the groove 110. After the rod part of the stepped screw passes through the third through hole on the heat collection plate 311, the head of the stepped screw is clamped outside the third through hole, some steps of the stepped screw are located in the third through hole, and the other steps are located between the inner side of the housing of the first folding part 100 and the heat collection plate 311. After the rod part of the stepped screw is screwed into the groove 110, an end face of the step of the stepped screw is clamped outside the groove 110. In this way, under the limitation of the step of the stepped screw, there is a specific distance between the inner side of the housing of the first folding part 100 and the heat collection plate 311, and therefore there is specific space for placing the washer 350 between the housing of the first folding part 100 and the heat collection plate 311.

Furthermore, the washer 350 is compressible, and can absorb pressure of the housing of the first folding part 100 on the washer 350 and pressure of the heat collection plate 311 on the washer 350. In this way, the screw 340 and the washer 350 form a floating design such that a tolerance generated due to deformation during assembly and rotation can be reduced, to ensure reliable engagement and separation.

In this embodiment of this application, the folding device includes the first folding part 100, the second folding part 200, and the heat dissipation apparatus 300. The first folding part 100 includes the heat source. The second folding part 200 includes the heat dissipation device. The heat dissipation apparatus 300 includes the heat collection element 310, the rotating shaft 320, and the cooling element 330. The heat collection element 310 includes the heat collection plate 311 and the first shaft sleeve 312. The first end 3111 of the heat collection plate 311 is in contact with the heat source in the first folding part 100, and the second end 3112 of the heat collection plate 311 is connected to the outer wall of the first shaft sleeve 312. The first shaft sleeve 312 is sleeved on the rotating shaft 320. The first end 331 of the cooling element 330 is in contact with the rotating shaft 320, and the second end 332 of the cooling element 330 is in contact with the heat dissipation device in the second folding part 200. In a case in which the folding device performs heat dissipation, when the heat source in the first folding part 100 generates heat, the heat collection plate 311 in the heat collection element 310 collects the heat generated by the heat source, the heat collection plate 311 transfers the heat collected from the heat source to the first shaft sleeve 312 in the heat collection element 310, the first shaft sleeve 312 in the heat collection element 310 then transfers the heat to the rotating shaft 320, the rotating shaft 320 then transfers the heat to the cooling element 330, and finally, the cooling element 330 transfers the heat to the heat dissipation device in the second folding part 200, and the heat dissipation device in the second folding part 200 dissipates the heat to the air, to complete heat dissipation for the folding device. The folding device may transfer the heat generated by the heat source in the first folding part 100 to the heat dissipation device in the second folding part 200. In this way, a heat dissipation region of the heat source is expanded, and a heat dissipation area of the folding device is increased. Therefore, a heat dissipation effect of the folding device is improved.

The following describes a heat dissipation apparatus according to an embodiment of this application.

Figure 15:
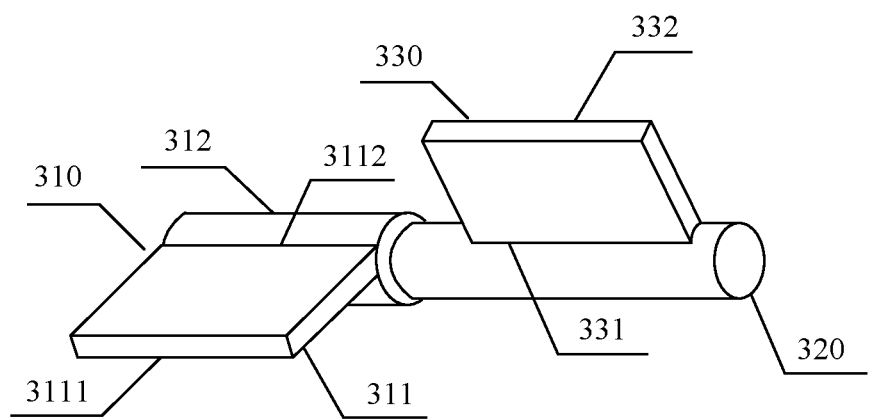
FIG. 15 is a fifth schematic structural diagram of a heat dissipation apparatus according to an embodiment of this application.

FIG. 15 is a schematic structural diagram of a heat dissipation apparatus according to an embodiment of this application. As shown in FIG. 15, the heat dissipation apparatus includes a heat collection element 310, a rotating shaft 320, and a cooling element 330. The heat collection element 310 includes a heat collection plate 311 and a first shaft sleeve 312. A first end 3111 of the heat collection plate 311 is in contact with a heat source in a first folding part of a folding device, and a second end 3112 of the heat collection plate 311 is connected to an outer wall of the first shaft sleeve 312. The first shaft sleeve 312 is sleeved on the rotating shaft 320. A first end 331 of the cooling element 330 is in contact with the rotating shaft 320, and a second end 332 of the cooling element 330 is in contact with a heat dissipation device in a second folding part of the folding device.

It should be noted that a structure of the heat dissipation apparatus is the same as the structure of the heat dissipation apparatus 300 in the foregoing embodiment. Details are not described in this embodiment of this application again.

In this embodiment of this application, the heat dissipation apparatus includes the heat collection element 310, the rotating shaft 320, and the cooling element 330. The heat collection element 310 includes the heat collection plate 311 and the first shaft sleeve 312. The first end 3111 of the heat collection plate 311 is in contact with the heat source in the first folding part of the folding device, and the second end 3112 of the heat collection plate 311 is connected to the outer wall of the first shaft sleeve 312. The first shaft sleeve 312 is sleeved on the rotating shaft 320. The first end 331 of the cooling element 330 is in contact with the rotating shaft 320, and the second end 332 of the cooling element 330 is in contact with the heat dissipation device in the second folding part of the folding device. In a case in which heat dissipation is performed for the folding device using the heat dissipation apparatus, when the heat source in the first folding part of the folding device generates heat, the heat collection plate 311 in the heat collection element 310 collects the heat generated by the heat source, the heat collection plate 311 transfers the heat collected from the heat source to the first shaft sleeve 312 in the heat collection element 310, the first shaft sleeve 312 in the heat collection element 310 then transfers the heat to the rotating shaft 320, the rotating shaft 320 then transfers the heat to the cooling element 330, and finally, the cooling element 330 transfers the heat to the heat dissipation device in the second folding part of the folding device, and the heat dissipation device in the second folding part dissipates the heat to air, to complete heat dissipation for the folding device. The heat dissipation apparatus may transfer the heat generated by the heat source in the first folding part of the folding device to the heat dissipation device in the second folding part of the folding device. In this way, a heat dissipation region of the heat source is expanded, and a heat dissipation area of the folding device is increased. Therefore, a heat dissipation effect of the folding device is improved.

What is claimed is:
1. A folding device comprising:
a first folding part comprising a heat source;
a second folding part comprising a heat dissipation device; and
a heat dissipation apparatus comprising:
   a heat collection element comprising:
      a heat collection plate comprising:
         a first end coupled to the heat source; and
         a second end; and
      a first shaft sleeve comprising a first outer wall coupled to the second end;

a rotating shaft, wherein the first shaft sleeve is configured to sleeve on a first part on the rotating shaft; and a cooling element comprising:
a first cooling plate further comprising a third end coupled to the rotating shaft;
a fourth end coupled to the heat dissipation device; and
wherein the cooling element further comprises:
a fifth end coupled to the rotating shaft; and
a sixth end coupled to the heat dissipation device.

2. The folding device of claim 1, wherein the first shaft sleeve further comprises a first inner wall, and wherein the heat dissipation apparatus further comprises a first thermally conductive lubricating material between the first inner wall and the rotating shaft.

3. The folding device of claim 2, wherein the heat dissipation apparatus further comprises:
a first through hole disposed on the first shaft sleeve; and
a first sealing element configured to seal the first through hole.

4. The folding device of claim 3, wherein the heat dissipation apparatus further comprises a first sealing ring, wherein a first annular groove is disposed on the first part, and wherein the first sealing ring is located in the first annular groove.

5. The folding device of claim 4, wherein the heat dissipation apparatus further comprises:
a second shaft sleeve sleeved on a second part on the rotating shaft other than the first part and comprising a second outer wall; and
a second cooling plate comprising:
a fifth end coupled to the second outer wall; and
an sixth end coupled to the heat dissipation device.

6. The folding device of claim 5, wherein the second shaft sleeve further comprises a second inner wall coupled to the rotating shaft.

7. The folding device of claim 6, wherein a second thermally conductive lubricating material is added between the second inner wall and the rotating shaft.

8. The folding device of claim 7, wherein a second through hole is disposed on the second shaft sleeve, and wherein the heat dissipation apparatus further comprises a second sealing element configured to seal the second through hole.

9. The folding device of claim 8, wherein the heat dissipation apparatus further comprises a second sealing ring, wherein a second annular groove is disposed on the second part, and wherein the second sealing ring is located in the second annular groove.

10. The folding device of claim 1, wherein the first folding part further comprises a first housing, wherein a groove comprising a third inner wall is disposed on an inner side of the first housing, wherein a third through hole is disposed on the heat collection plate, and wherein the heat dissipation apparatus further comprises:

a washer located between the inner side and the heat collection plate and comprising a fourth through hole; and
a screw comprising a rod part that passes through the third through hole and the fourth through hole and is threaded with the third inner wall.

11. The folding device of claim 1, wherein the heat dissipation apparatus further comprises two or more heat collection elements and two or more cooling elements.

12. The folding device of claim 1, wherein the heat dissipation apparatus further comprises two or more heat collection elements.

13. The folding device of claim 1, wherein the heat dissipation apparatus further comprises two or more cooling elements.

14. The folding device of claim 1, wherein a side surface of the cooling element is coupled to a folding edge in the second folding part, wherein the folding edge wraps the first outer wall and the rotating shaft and is configured to shield the first shaft sleeve and the rotating shaft when the first folding part and the second folding part are engaged.

15. The folding device of claim 1, wherein the cooling element comprises a ferrule located in a slot in the second folding part.

16. The folding device of claim 1, wherein a heat conductivity of each of the heat collection element, the rotating shaft, and the cooling element is greater than or equal to 120 watts (W)/(meters (m)·kelvin (K)).

17. A heat dissipation apparatus comprising:
a heat collection element comprising:
a heat collection plate comprising:
a first end coupled to a heat source in a first folding part of a folding device; and
a second end; and
a first shaft sleeve comprising an outer wall coupled to the second end;
a rotating shaft, wherein the first shaft sleeve is sleeved on the rotating shaft; and
a cooling element comprising:
a third end coupled to the rotating shaft; and
a fourth end coupled to a heat dissipation device in a second folding part of the folding device; and
wherein the cooling element further comprises a first cooling plate further comprising:
a fifth end coupled to the rotating shaft; and
a sixth end coupled to the heat dissipation device.

18. The heat dissipation apparatus of claim 17, wherein the first shaft sleeve further comprises an inner wall, and wherein the heat dissipation apparatus further comprises a thermally conductive lubricating material between the inner wall and the rotating shaft.

19. The heat dissipation apparatus of claim 18, further comprising:
a through hole disposed on the first shaft sleeve; and
a sealing element configured to seal the through hole.

* * * * *